United States Patent [19]

Wickramanayake et al.

[11] Patent Number: 5,713,989

[45] Date of Patent: Feb. 3, 1998

[54] BLEED ALLEVIATED AQUEOUS PIGMENT DISPERSION-BASED INK-JET INK COMPOSITIONS

[75] Inventors: Palitha Wickramanayake; Dennis P. Parazak, both of Corvallis, Oreg.

[73] Assignee: Hewlett-Packard Company, Palo Alto, Calif.

[21] Appl. No.: 741,147

[22] Filed: Oct. 29, 1996

Related U.S. Application Data

[63] Continuation-in-part of Ser. No. 610,687, Mar. 4, 1996, abandoned, which is a continuation-in-part of Ser. No. 528,077, Sep. 14, 1995, Pat. No. 5,531,816.

[51] Int. Cl.$^6$ ............................................. C09D 11/02
[52] U.S. Cl. ............... 106/31.6; 106/31.65; 106/31.86; 106/31.88; 106/31.89; 106/31.25
[58] Field of Search .............................. 106/20 R, 20 D, 106/20 C, 23 H, 31.6, 31.65, 31.86, 31.88, 31.89, 31.25

[56] References Cited

U.S. PATENT DOCUMENTS

| | | | |
|---|---|---|---|
| 4,963,189 | 10/1990 | Hindagolla | 106/22 K |
| 5,106,416 | 4/1992 | Moffatt et al. | 106/20 R |
| 5,116,409 | 5/1992 | Moffatt | 106/22 R |
| 5,133,803 | 7/1992 | Moffatt | 106/25 R |
| 5,181,045 | 1/1993 | Shields et al. | 346/1.1 |
| 5,198,023 | 3/1993 | Stoffel | 106/22 R |
| 5,226,957 | 7/1993 | Wickramanayake et al. | 106/26 R |
| 5,531,816 | 7/1996 | Wickramanayake | 106/20 R |
| 5,565,022 | 10/1996 | Wickramanayake | 106/22 R |

Primary Examiner—Helene Klemanski

[57] ABSTRACT

Bleed control and fast dry times are achieved in aqueous pigment dispersion-based ink-jet ink compositions by formulating the ink compositions to comprise at least one aqueous pigment dispersion and a microemulsion comprising at least one water-insoluble organic compound, at least one hydrotropic amphiphile, and water. The hydrotropic amphiphile is present in the microemulsion in an amount sufficient to solubilize the water-insoluble organic compound.

23 Claims, 2 Drawing Sheets

BLEED ALLEVIATED AQUEOUS PIGMENT DISPERSION-BASED INK-JET INK COMPOSITIONS

CROSS-REFERENCE TO RELATED APPLICATIONS

The present application is a continuation-in-part of application Ser. No. 08/610,687, filed Mar. 4, 1996, now abandoned, which in turn is a continuation-in-part of application Ser. No. 08/528,077, filed on Sep. 14, 1995, now U.S. Pat. No. 5,531,816, issued Jul. 2, 1996. Specifically, the parent application is entitled "Bleed Alleviated Aqueous Pigment Dispersion-Based Ink-Jet Ink Compositions" and is directed to bleed control in aqueous pigment dispersion-based inks using at least one hydrotropic amphiphile, while the grandparent application is entitled "Bleed-Alleviated, Waterfast, Pigment-Based Ink-Jet Ink Compositions" and is directed to bleed control of solvent-dispersed pigment-based ink-jet ink compositions. The present application is also related to application Ser. No. 08/528,072, likewise filed on Sep. 14, 1995, now U.S. Pat. No. 5,565,022, issued Oct. 15, 1996. The latter related application is entitled "Fast Drying, Bleed-Free Ink-Jet Ink Compositions" and is directed to bleed control of dye-based ink-jet ink compositions.

TECHNICAL FIELD

The present invention relates to ink compositions employed in ink-jet printing and, more particularly, to the reduction of bleed and improvement of dry time of aqueous pigment dispersion-based ink-jet ink compositions.

BACKGROUND ART

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet inks are mostly available as dye-based compositions. However, a very limited number of pigment-based inks are also available. Indeed, only two black pigment-based inks are commercially available at the present time; no color pigment-based inks are commercially available. Perhaps the most desirable property that pigments offer is their superior lightfastness. However, pigments have not found extensive use in ink-jet ink compositions partly due to their natural tendency to agglomerate in aqueous (hydrophilic) media. Pigment particles tend to agglomerate because their outer surfaces create natural forces of attraction between the particles. The agglomeration of pigment particles can result in poor print quality, due to defects such as those deriving from print density variation and mottling, and poor reliability. Typically, water-soluble dispersing agents are used to deagglomerate pigment particles in aqueous solutions.

While the agglomeration problems associated with pigments have been addressed, difficulties in unheated bleed control constitute another problem area for aqueous pigment dispersion based inks, albeit one shared with aqueous dye-based inks. Pigment-based inks formulated as dispersions in aqueous media exhibit bleed when printed adjacent to other aqueous ink compositions, whether dye-based or pigment-based. The term "bleed", as used herein, is defined to be the invasion of one color into another, as evidenced by a ragged border therebetween. Bleed occurs as colors mix both on the surface of the paper substrate as well as within the substrate itself. Bleed is particularly problematic in ink-jet color printing, given that aqueous yellow, cyan, and magenta ink compositions are printed in various proportions and combinations adjacent to one another and to black ink. To achieve superior print quality, it is necessary to have borders between colors that are bleed-free.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially formulated paper is more expensive than "plain" paper. Thus, using external paraphernalia to reduce bleed in ink-jet color printing is generally not cost effective. Another commonly-employed method for reducing bleed involves the use of bleed control algorithms in ink-jet printers to provide borders between colors that are clean and free from the invasion of one color into another; however, such algorithms slow down the printer.

Other proposed solutions to the problem of bleed involve changing the composition of an ink-jet ink. For example, surfactants have been effectively used to reduce bleed in dye-based ink formulations; see, e.g., U.S. Pat. No. 5,106,416 entitled "Bleed Alleviation Using Zwitterionic Surfactants and Cationic Dyes", issued to John Moffatt et al; U.S. Pat. No. 5,116,409, entitled "Bleed Alleviation in Ink-Jet Inks", issued to John Moffatt; and U.S. Pat. No. 5,133,803 entitled "High Molecular Weight Colloids Which Control Bleed", issued to John Moffatt, all assigned to the same assignee as the present application. However, surfactants increase the penetration rate of the ink into the paper, which may also result in the reduction of edge acuity. Other solutions specific to dye-based ink compositions, disclosed in patents assigned to the present assignee, are found in U.S. Pat. No. 5,198,023, entitled "Cationic Dyes with Added Multi-Valent Cations to Reduce Bleed in Thermal Ink-Jet Inks", issued to John Stoffel, and U.S. Pat. No. 5,181,045, entitled "Bleed Alleviation Using pH-Sensitive Dyes", issued to James Shields et al, both assigned to the same assignee as the present application.

While the problem of black to color and color to color bleed has been the subject of much study, none of the above-described solutions are applicable to pigment-based ink compositions, save for the use of heated platens and specially-formulated paper, which generally are not cost effective. For example, surfactants, if added in concentrations similar to those used in dye-based formulations to achieve bleed control, would destabilize pigment dispersions made with water-soluble dispersing agents. This is because the dispersing agents, themselves being surface active compounds, would be competitively displaced by the added surfactants that compete to attach to the pigment surface.

Related U.S. Pat. No. 5,565,022, entitled "Bleed-Alleviated, Waterfast, Pigment-Based Ink-Jet Ink Compositions" and assigned to the same assignee as the present application, is directed to bleed control of solvent-dispersed pigment-based ink-jet ink compositions. More specifically, bleed control for such inks is achieved by dispersing the pigment in a water-insoluble organic compound kept in solution in the form of a microemulsion. The microemulsion is an isotropic solution of water, a water-insoluble organic compound, and an amphiphile, there being sufficient amphiphile to solubilize the water-insoluble compound in water. The pigment is dispersed in the water-insoluble portion of the microemulsion by such means as a hydrophobic dispersing agent, an encapsulant, or by surface modification. Thus, the water-insoluble organic compound serves as a primary solvent for the pigment particles and the water serves as a continuous phase for the microemulsion droplets of organic compound, having been formed with the addition of an amphiphile. Again, however, this solution to bleed is not directed to aqueous pigment dispersion-based ink-jet inks, but rather is specifically directed to solvent-dispersed pigment-based inks.

Therefore, while bleed control has been achieved by adjusting the compositions of dye-based and solvent-dispersed pigment-based ink-jet ink compositions, the bleed experienced with aqueous pigment dispersion-based ink-jet ink compositions remains largely unchecked, save for the use of printer paraphernalia such as heated platens, specially-formulated paper, and bleed control algorithms.

In addition to desiring bleed control in ink-jet ink formulations, it is also universally desired to develop ink formulations with improved dry times in ink-jet printing in order to gain in throughput. Ink-jet printers are presently incapable of matching the level of throughput generated by laser printers, due in large part to the relatively slow dry time of ink-jet inks as well as to printer slow-down deriving from the resident bleed-control algorithms in the printer. The solutions used to effect bleed control described above also typically improve dry times, these two attributes being closely associated with one another.

Accordingly, a need exists for aqueous pigment dispersion-based inks for use in ink-jet printing that evidence reduced bleed and dry rapidly upon impact with the print medium. However, the print quality of the ink composition must not be sacrificed to achieve faster dry times.

DISCLOSURE OF INVENTION

In accordance with the invention, an aqueous pigment dispersion-based ink-jet ink composition is provided which employs pigment particles dispersed in the aqueous phase of a microemulsion. Specifically, the pigment-based ink-jet ink composition of the present invention comprises:

(a) at least one aqueous pigment dispersion; and
(b) a microemulsion comprising:
  (i) at least one water-insoluble organic compound,
  (ii) at least one hydrotropic amphiphile, and
  (iii) water, wherein the hydrotropic amphiphile is present in an amount sufficient to solubilize the organic compound.

Any aqueous pigment dispersion suitable for use in ink-jet printing may benefit in the practice of the invention, so long as it remains compatible with the remaining components in the ink-jet ink composition. The microemulsion comprising a water-insoluble organic compound, a hydrotropic amphiphile, and water is a thermodynamically-stable isotropic solution in which the interfacial tension between the water and the water-insoluble organic compound has been minimized by the amphiphile.

A method of reducing bleed in ink-jet printing is also provided which involves providing the above described aqueous pigment dispersion-based ink and printing the same onto a print medium. Since typical color ink-jet printers employ an ink set having three color inks and a single black ink, it is contemplated that any or all of the four inks may be formulated according to the present invention to achieve high quality printing with reduced bleed. Preferably all four inks in a set of ink-jet inks would be formulated in accordance with the invention, such that the print quality optimally benefits from improved dry time, bleed control, and uniformity of coverage and thickness.

The present aqueous pigment dispersion-based ink-jet ink composition and method of reducing bleed may be used with a variety of ink-jet printers such as continuous, piezoelectric drop-on-demand printers and thermal or bubble jet drop-on-demand printers. Printing may be done on a variety of media; examples include paper, textiles, and transparencies. The reduction of bleed and dry-time improvement in aqueous pigment dispersion-based inks achieved in the practice of the invention enable ink-jet printers to effect high print qualities in a cost-effective manner.

BEST MODES FOR CARRYING OUT THE INVENTION

Figure 1:
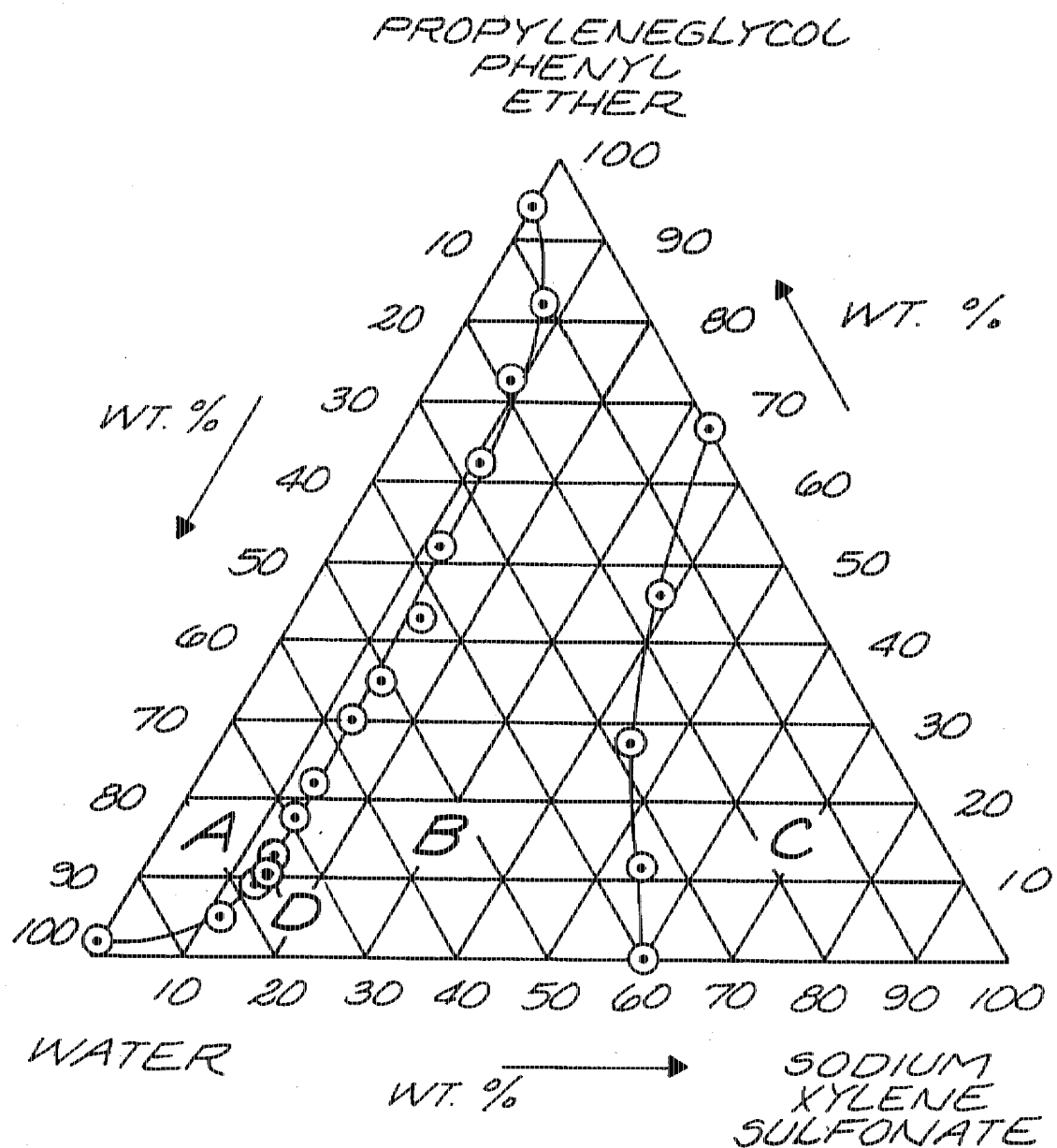
FIGS. 1 and 2 are ternary phase diagrams showing the composition regions of the microemulsion-based vehicle component of ink-jet ink compositions made in accordance with the invention, the microemulsion component having a particular combination of a water-insoluble organic compound, a hydrotropic amphiphile, and water.

In the practice of the invention, the bleed alleviation and fast dry times are exhibited by the aqueous pigment dispersion-based inks by employing a microemulsion as the ink vehicle. More specifically, the microemulsion comprises (i) at least one water-insoluble organic compound; (ii) at least one hydrotropic amphiphile; and (iii) water. The hydrotropic amphiphile is present in an amount that completely solubilizes the organic compound, thereby resulting in a clear, stable microemulsion.

All concentrations herein are in weight percent, unless otherwise indicated. The purity of all components is that employed in normal commercial practice for ink-jet inks.

A wide variety of organic and inorganic pigments, either alone or in combination, may be benefited in the practice of the invention, since it is contemplated that any pigment or combination thereof may be benefited in the practice of the invention. The term "pigment" as used herein means a water insoluble colorant. In practice, pigment particles are deagglomerated or dispersed in aqueous media to achieve greater uniformity in print quality of the ink. Any means for dispersing the pigment particles that is compatible with the remaining ink components may be employed in the practice of the invention. Examples of suitable dispersing means include hydrophilic pigment dispersing agents and the modification of the pigment surface to achieve compatibility with an aqueous solution. Any hydrophilic dispersing agent that is compatible with the pigment may be employed in the practice of the invention. Examples of classes of polymeric dispersing agents commonly used to disperse pigment particles in aqueous media include random, block, and branched-type polymers. The polymer may be anionic, cationic, or nonionic in nature.

At least one aqueous pigment dispersion is employed in the practice of the invention. Each such aqueous pigment dispersion may include at least one surface modified pigment.

It is contemplated that a commercially-available concentrated aqueous pigment dispersion is employed in the practice of the invention. Examples of such pigment dispersions include Hostaline Yellow and Hostaline Green, which are available from Hoechst; and Fuji BBL Red and Fuji BBL Magenta, which are available from Fuji Pigment Co., Japan. It is noted that the water present in such commercially-available concentrated aqueous pigment dispersions forms part of the microemulsion-based ink.

The particle size of the pigments is an important consideration in ink-jet printing, since the pigment particles must be sufficiently small to permit free flow of the ink through the ink-jet printing devices. For example, the ejecting nozzles of thermal inkjet office printers typically have diameters on the order of about 10 to 60 µm. The particle size of the pigments is also an important consideration in achieving stability of the pigment dispersion as well as color strength and gloss. Given these considerations, the range of useful particle size is about 0.005 to 15 µm. Preferably, the pigment particle size should range from about 0.005 to 5 µm and, more preferably, from about 0.005 to 1 µm. Most preferably, the pigment particle size ranges from about 0.005 to 0.3 µm. However, in non-office applications, larger pigment particle sizes may be employed.

The pigment may represent up to about 20 wt % of the ink composition, but should generally range from about 0.1 to 10 wt %. Preferably, the pigment represents about 0.1 to 8 wt % of the ink composition.

In accordance with the invention, the aqueous pigment dispersion is taken in a microemulsion-based vehicle to achieve bleed control and fast drying in the resulting ink-jet ink formulation. Microemulsions are defined as thermodynamically stable isotropic "solutions" of water, oil, and amphiphile and are used to solubilize water-insoluble compounds. In the practice of the invention, the microemulsion comprises water, at least one water-insoluble organic compound, and at least one hydrotropic amphiphile. Within the microemulsion composition, the function of the amphiphile is to lower the interfacial tension between water and the water insoluble organic compound, thereby forming a stable system.

Examples of water-insoluble organic compounds that may be suitably employed in the practice of the invention include, but are not limited to, water-insoluble mono- or polyglycol ethers; water-insoluble mono- or polyglycol phenyl ethers; water-insoluble alcohols; water-insoluble mono- or polyglycol esters; water-insoluble terpenes; water-insoluble phenols; water-insoluble aldehydes and ketones; and water-insoluble hydrocarbons. In general, any water-insoluble organic compound, or combination thereof, may be employed in the practice of the invention so long as it may be solubilized by a hydrotropic amphiphile and so long as it is compatible with the other components in the ink-jet ink composition. Specific examples of water-insoluble organic compounds that are preferably employed in the practice of the invention include, but are not limited to: (1) ethylene, propylene, polyethylene, and polypropylene glycol phenyl ethers; (2) ethylene, propylene, polyethylene, and polypropylene glycol esters such as acrylates; and (3) benzyl alcohol. Additionally, specific examples of preferably-employed hydrocarbons include toluene, xylenes, naphthalene, and phenanthrene. Further examples of the water-insoluble organic compounds include alpha-terpineol, citronellal, hydroxy citronellal, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanol, n-hexanol, 2-hexanol, n-pentanol, cinnamyl alcohol, cinnamaldehyde, m-cresol, 3-phenyl-1-propanol, and salicylaldehyde. Mono- and diethylene glycol phenyl ether, mono- and dipropylene glycol phenyl ether, and benzyl alcohol are most preferably employed in the practice of the invention.

The water-insoluble organic component may range in concentration from about 1 to 70 wt % of the ink-jet ink composition. Preferably, the water-insoluble organic component ranges from about 1 to 20 wt % of the ink-jet ink composition.

In addition to providing the microemulsion with an oil component, the water-insoluble organic component serves as a co-solvent in the present ink-jet ink compositions such as commonly employed in ink-jet printing. More particularly, when the pen of the ink-jet printer idles and is exposed to the atmosphere, the water in the ink vehicle evaporates. The presence of this co-solvent in the ink vehicle prevents crust formation and nozzle clogging. Hence, the vapor pressure of the organic compound should be sufficiently low in comparison to that of water that it does not evaporate during the normal operation of ink-jet printing. It is noted that an advantage to increasing the concentration of the water-insoluble organic component in the present ink-jet ink compositions is a reduction in paper cockle, which derives from the attendant decrease in the water content of the ink.

The hydrotropic amphiphile employed in the practice of the invention may be any hydrotropic amphiphile that yields a microemulsion with the water-insoluble organic compound and water. Suitable hydrotropic amphiphiles, like other surfactants in general, solubilize the water-insoluble organic compound in water by breaking the compound into very small droplets and maintaining these droplets in a microemulsion. However, unlike other classes of surfactants, hydrotropic amphiphiles do not compete with the hydrophilic dispersing agent (also a surface active compound) for the pigment surface, which might destabilize the pigment dispersion. Further, hydrotropic amphiphiles do not result in the precipitous drop in surface tension associated with the use of other surfactants, such that the reduction in surface tension for inks employing hydrotropic amphiphiles in the practice of the invention is curbed in comparison. In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected. Thus, hydrotropic amphiphiles serve to solubilize the water-insoluble organic compound without risking (1) destabilization of the pigment dispersion; (2) puddling on the nozzle plate; or (3) loss of edge acuity.

The proper amount of hydrotropic amphiphile in the microemulsion is that amount that solubilizes the water-insoluble organic compound. It is noted that a mixture of hydrotropic amphiphiles may be employed in the practice of the invention. The determination of a given hydrotropic amphiphile and its concentration is considered not to constitute undue experimentation in view of the teachings of this invention.

The hydrotropic amphiphile may be anionic, cationic, or non-ionic in nature. Examples of anionic hydrotropic amphiphiles suitably employed in the practice of the invention include, but are not limited to, salts of: benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, and decane sulfonic acid. The cation associated with these salts may be $Na^+$, $K^+$, $Li^+$, or $NH_4^+$.

Examples of cationic hydrotropic amphiphiles suitably employed in the practice of the invention include, but are not limited to, p-amino benzoic acid hydrochloride, procaine hydrochloride, caffeine, and salts of: alkylpyridium, alkyltrimethyl ammonium, benzyltrialkyl ($C_1$ to $C_4$) ammonium, and phenyltrimethyl ammonium cations. The anions associated with these salts may be any of the halides, particularly $Cl^-$.

Examples of non-ionic hydrotropic amphiphiles suitably employed in the practice of the invention include, but are not limited to, resorcinol and pyrogallol.

Optionally, a co-surfactant may be added to the present ink-jet ink compositions. Examples of suitably-employed co-surfactants include, but are not limited to, lactams such as 2-pyrrolidone; glycols; diols; glycol esters; mono- and di-glycol ethers, including ethylene glycol monobutyl ether, diethylene glycol ethers, diethylene glycol mono ethyl, butyl, hexyl ethers, propylene glycol ether, dipropylene glycol ether, and triethylene glycol ether; mid-chain alcohols such as butyl alcohol, pentyl alcohol, and homologous alcohols; and acetylenic polyethylene oxides. Preferably, if a co-surfactant is employed, the co-surfactant comprises a mid-chain alcohol or a diol, having from 3 to 8 carbon atoms. The co-surfactant may represent up to 10 wt % of the ink composition, either serving as a separate component or as a partial replacement for the hydrotropic amphiphile.

The amount of hydrotropic amphiphile appropriately employed in a particular microemulsion may be determined in at least two ways, namely by an abbreviated method or a more systematic method. In the abbreviated method, one must first combine the water-insoluble organic compound(s) and water in a ratio that reflects the desired final composition of the microemulsion for the ink-jet ink composition. The resulting two-phase liquid is therefer titrated with the selected hydrotropic amphiphile(s) until a clear solution is obtained, representing the solubilization of the organic compound such that a single-phase solution is achieved. About 1% excess hydrotropic amphiphile may optionally be added to ensure a stable solution. Thus, the appropriate relational concentrations of the water-insoluble organic compound(s), water, and hydrotropic amphiphile(s) are determined through the above-described titration process.

Figure 2:
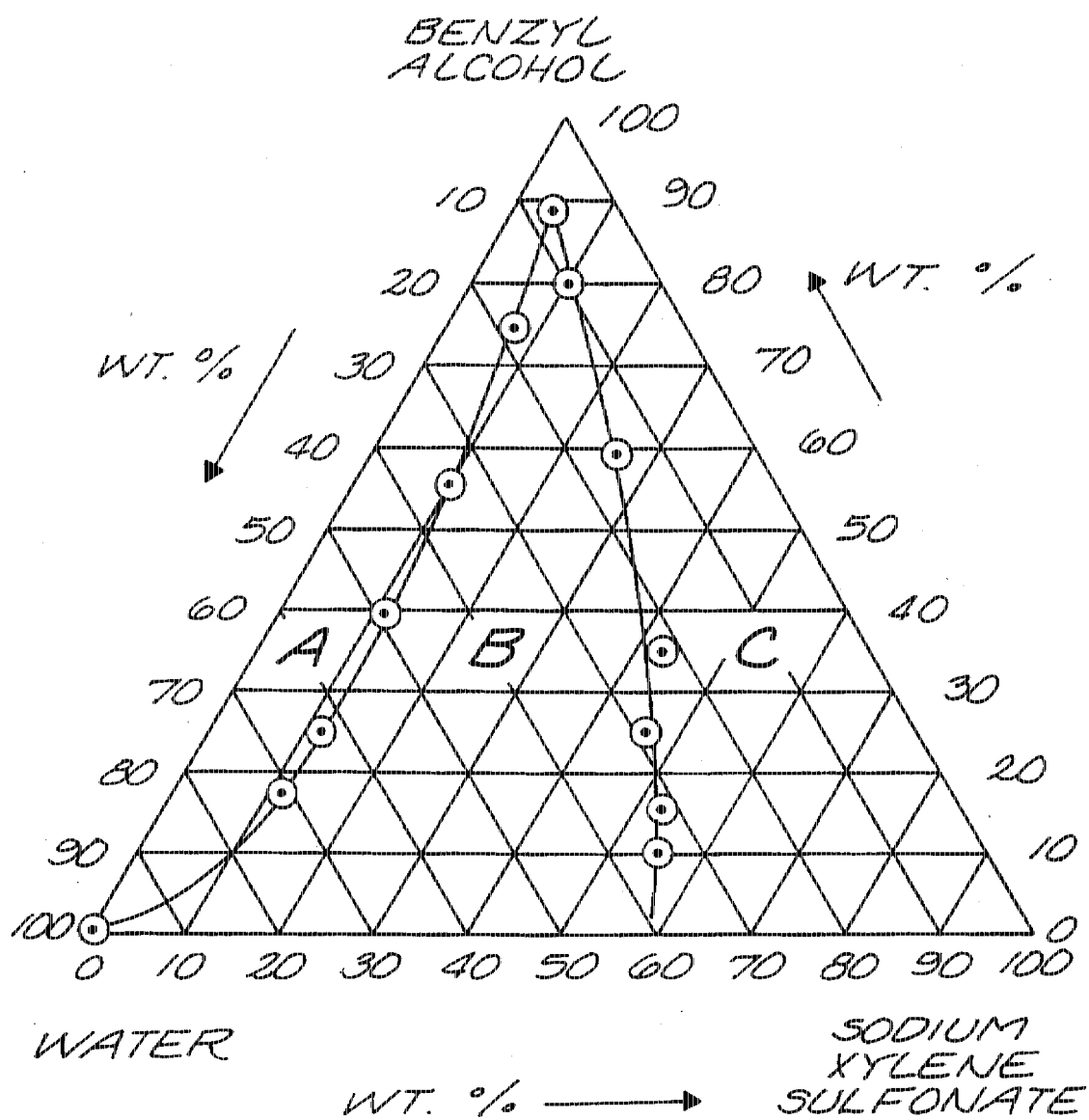

In the event one chooses to determine the appropriate amount of hydrotropic amphiphile(s) in a more systematic approach, the first step involves the construction of a phase diagram to represent the combination of the water-insoluble organic compound and water. More specifically, a phase diagram is constructed by combining water and the water-insoluble organic compound(s) in various proportions, titrating each mixture against the hydrotropic amphiphile(s) until a clear, single-phase region is determined within the phase diagram. By further titrating beyond the clear point, other regions of multi-phase or semi-solid compositions can be determined. These results, when plotted on a conventional triangular plot, represent a ternary phase diagram. For example, FIG. 1 depicts such a ternary phase diagram for a microemulsion comprising propylene glycol phenyl ether, sodium xylene sulfonate, and water, wherein Area A represents a milky region having two phases, Area B represents a single-phase isotropic region, and Area C represents a semi-solid region. The single-phase isotropic region (Area B of FIG. 1) indicates compositions of organic compound(s), water, and hydrotropic amphiphile(s) that are most suitable for use in an ink-jet ink composition. Thus, one may select any composition from this single-phase region in the practice of the invention, provided the composition meets any other criteria for the particular ink-jet ink composition. In another example, FIG. 2 depicts such a ternary phase diagram for a microemulsion comprising benzyl alcohol, sodium xylene sulfonate, and water, where Area B again represents the single phase isotropic region.

Similar results are obtained in the following ternary systems: (1) water-sodium salicylate-ethylene glycol phenyl ether; (2) water-sodium salicylate-propylene glycol phenyl ether; (3) water-sodium benzoate-ethylene glycol phenyl ether; (4) water-sodium benzoate-propylene glycol phenyl ether; (5) water-sodium xylene sulfonate-ethylene glycol phenyl ether; (6) water-pyrogallol-benzyl alcohol; and (7) water-sodium xylene sulfonate-benzyl alcohol.

It should be noted that compositions within Area A may be employed in those applications not requiring a long shelf life, such as textile printing. Likewise, use of a heated print cartridge could permit compositions within Area C to be employed.

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

To formulate the ink-jet ink composition, water, hydrotropic amphiphile(s), and the water-insoluble organic compound are first combined. This mixture is then "let down" into the pigment dispersion concentrate at a slow flow rate while agitating the pigment dispersion. Any additional additives may also be added to the mixture. The mixture is then homogenized, such as by stirring, shaking, or other means of agitation, to form the microemulsion-based ink. Attempts to formulate the microemulsion by merely adding all of the ingredients together could result in flocculating the pigment dispersion.

Aqueous pigment dispersion-based ink compositions formulated in accordance with the invention are bleed alleviated and will exhibit fast dry times and good print qualities. The examples given below demonstrate just that.

EXAMPLES

An ink-jet ink composition was prepared consisting of 3 wt % Hostaline Yellow as a colorant (commercially available from Hoescht); 10 wt % propylene glycol phenyl ether; 13 wt % sodium xylene sulfonate; and the balance water, with the concentrations of the vehicle components having been determined by constructing the phase diagram depicted in FIG. 1. More specifically, the phase diagram depicted in FIG. 1 was constructed by combining propylene glycol phenyl ether and water in various proportions and then titrating each mixture against sodium xylene sulfonate until a clear, single-phase region was determined. Thus, Area A of FIG. 1 represents the various combinations of propylene glycol phenyl ether, sodium xylene sulfonate, and water than yielded a two-phase region evidenced by a milky appearance. Area B of FIG. 1 represents the various combinations of propylene glycol phenyl ether, sodium xylene sulfonate, and water that yielded a clear, single-phase region. Area C of FIG. 1 was defined by further titrating the mixtures of propylene glycol phenyl ether and water with sodium xylene sulfonate beyond the clear point until a semi-solid phase region was defined. The single-phase isotropic region of FIG. 1 indicates compositions of propylene glycol phenyl ether, sodium xylene sulfonate, and water that may be suitably employed in the practice of the invention. The compositions indicated by Areas A and C represent ink vehicles outside of the scope of the invention.

The ink-jet ink composition of this example falls within the single-phase isotropic region of Area B in FIG. 1. More specifically, the vehicle of this ink composition contained, as a percentage of total ink vehicle, about 10 wt % propylene glycol phenyl ether, about 13 wt % sodium xylene sulfonate, and the balance water. Point D on FIG. 1 indicates that the vehicle of this example ink composition indeed falls within the clear single-phase region Area B of the ternary phase diagram.

The ink-jet ink composition of this example was printed on plain paper using a 45 picoliter drop volume pen at a 300 dpi resolution. The ink dried instantaneously upon impact with plain paper. In comparison, it is known that ink-jet ink compositions having a water-soluble co-solvent, such as 2-pyrrolidone, exhibit finite, readily-measurable dry times and lack bleed control when printed on plain paper (see, e.g., U.S. Pat. No. 4,963,189 entitled "Waterfast Ink Formulations with a Novel Series of Anionic Dyes Containing Two or More Carboxyl Groups", issued to Suraj Hindagolla et al and assigned to the same assignee as the present application). Furthermore, when the ink of the above example was printed next to another ink of identical vehicle, but with a different colorant, namely Hostaline Green, it was bleed alleviated.

Thus, it is has been demonstrated that ink-jet ink compositions made in accordance with the invention are bleed alleviated and exhibit fast dry times upon printing by an ink-jet printer.

INDUSTRIAL APPLICABILITY

The present ink-jet ink compositions and method for controlling bleed and reducing dry time in ink-jet printing as disclosed herein are expected to find commercial use in ink-jet printing.

Thus, there has been disclosed an aqueous pigment dispersion-based ink-jet ink composition as well as a method of controlling bleed and reducing dry time in ink-jet printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A pigment-based ink-jet ink composition comprising:
   (a) at least one aqueous pigment dispersion; and
   (b) a microemulsion comprising:
      (i) at least one water-insoluble organic compound,
      (ii) at least one hydrotropic amphiphile, and
      (iii) water, wherein said hydrotropic amphiphile is present in an amount sufficient to solubilize said at least one water-insoluble organic compound in said microemulsion.

2. The pigment-based ink-jet ink composition of claim 1 wherein said at least one aqueous pigment dispersion includes at least one pigment, said at least one pigment present in said pigment-based ink-jet ink composition in an amount up to about 20 wt %.

3. The pigment-based ink-jet ink composition of claim 2 wherein said at least one pigment is present in said pigment-based ink-jet ink composition in an amount within the range of about 0.1 to 10 wt %.

4. The pigment-based ink-jet ink composition of claim 2 wherein said at least one pigment has a particle size ranging from about 0.005 to 15 µm.

5. The pigment-based ink-jet ink composition of claim 1 wherein said at least one aqueous pigment dispersion includes at least one hydrophilic pigment dispersing agent selected from the group consisting of random, block, and branched polymers.

6. The pigment-based ink-jet ink composition of claim 1 wherein said at least one aqueous pigment dispersion includes at least one surface modified pigment.

7. The pigment-based ink-jet ink composition of claim 1 wherein said water-insoluble organic compound is selected from the group consisting of water-insoluble monoglycol ethers, water-insoluble polyglycol ethers, water-insoluble monoglycol phenyl ethers, water-insoluble polyglycol phenyl ethers, water-insoluble alcohols, water-insoluble monoglycol esters, water-insoluble polyglycol esters, water-insoluble terpenes, water-insoluble phenols, water-insoluble aldehydes and ketones, and water-insoluble hydrocarbons.

8. The pigment-based ink-jet ink composition of claim 7 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, phenanthrene, benzyl alcohol, alpha-terpineol, citronellal, hydroxy citronellal, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanol, n-hexanol, 2-hexanol, n-pentanol, cinnamyl alcohol, cinnamaldehyde, m-cresol, 3-phenyl-1-propanol, and salicylaldehyde.

9. The pigment-based ink-jet ink composition of claim 1 wherein said at least one water-insoluble organic compound is present in said ink-jet ink composition in an amount ranging from about 1 to 70 wt %.

10. The pigment-based ink-jet ink composition of claim 1 wherein said at least one hydrotropic amphiphile is selected from the group consisting of (a) salts of: benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, and decane sulfonic acid; (b) p-amino benzoic acid hydrochloride, procaine hydrochloride, caffeine, and salts of: alkylpyridium, alkyltrimethyl ammonium, benzyltrialkyl ($C_1$ to $C_4$) ammonium, and phenyltrimethyl ammonium cations; and (c) resorcinol and pyrogallol.

11. The pigment-based ink-jet ink composition of claim 1 wherein said at least one water-insoluble organic compound is selected from the group consisting of monoethylene glycol phenyl ether, diethylene glycol phenyl ether, monopropylene glycol phenyl ether, dipropylene glycol phenyl ether and benzyl alcohol, and said at least one hydrotropic amphiphile is selected from the group consisting of sodium xylene sulfonate, sodium salicylate, and sodium benzoate.

12. The pigment-based ink-jet ink composition of claim 1 further comprising up to about 10 wt % of a co-surfactant comprising a compound selected from the group consisting of an alcohol and a diol, said co-surfactant having a carbon chain length ranging from three to eight carbon atoms.

13. A method of reducing bleed and dry time in ink-jet printing comprising:
   (a) providing an aqueous pigment dispersion-based ink-jet ink composition comprising:
       (i) at least one aqueous pigment dispersion, and
       (ii) a microemulsion comprising at least one water-insoluble organic compound, at least one hydrotropic amphiphile, and water, wherein said hydrotropic amphiphile is present in an amount sufficient to solubilize said at least one water-insoluble organic compound in said microemulsion; and
   (b) printing said aqueous pigment dispersion-based ink-jet ink composition on a print medium by means of an ink-jet pen, whereupon said aqueous pigment dispersion-based ink-jet ink composition exhibits a fast dry time and is bleed-alleviated.

14. The method of claim 13 wherein said at least one aqueous pigment dispersion includes at least one pigment, said at least one pigment present in said aqueous pigment dispersion-based ink-jet ink composition in an amount within the range of about 0.1 to 10 wt %.

15. The method of claim 14 wherein said at least one pigment has a particle size ranging from about 0.005 to 15 µm.

16. The method of claim 13 wherein said at least one aqueous pigment dispersion includes a hydrophilic pigment dispersing agent selected from the group consisting of random, block, and branched polymers.

17. The method of claim 13 wherein said at least one aqueous pigment dispersion includes a surface modified pigment.

18. The method of claim 13 wherein said water-insoluble organic compound is selected from the group consisting of water-insoluble monoglycol ethers, water-insoluble polyglycol ethers, water-insoluble monoglycol phenyl ethers, water-insoluble polyglycol phenyl ethers, water-insoluble alcohols, water-insoluble monoglycol esters, water-insoluble polyglycol esters, water-insoluble terpenes, water-insoluble phenols, water-insoluble aldehydes and ketones, and water-insoluble hydrocarbons.

19. The method of claim 18 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, benzyl alcohol, phenanthrene, alpha-terpineol, citronellal, hydroxy citronellal, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanol, n-hexanol, 2-hexanol, n-pentanol, cinnamyl alcohol, cinnamaldehyde, m-cresol, 3-phenyl-1-propanol, and salicylaldehyde.

20. The method of claim 13 wherein said at least one water-insoluble organic compound is present in said ink-jet ink composition in an amount ranging from about 1 to 70 wt %.

21. The method of claim 13 wherein said at least one hydrotropic amphiphile is selected from the group consisting of (a) salts of: benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, and decane sulfonic acid; (b) p-amino benzoic acid hydrochloride, procaine hydrochloride, caffeine, and salts of: alkylpyridium, alkyltrimethyl ammonium, benzyltrialkyl ($C_1$ to $C_4$) ammonium, and phenyltrimethyl ammonium cations; and (c) resorcinol and pyrogallol.

22. The method of claim 13 wherein said at least one water-insoluble organic compound is selected from the group consisting of monoethylene glycol phenyl ether, diethylene glycol phenyl ether, monopropylene glycol phenyl ether, dipropylene glycol phenyl ether and benzyl alcohol, and said at least one hydrotropic amphiphile is selected from the group consisting of sodium xylene sulfonate, sodium salicylate, and sodium benzoate.

23. The method of claim 13 wherein said aqueous pigment dispersion-based ink-jet ink composition further comprises up to about 10 wt % of a co-surfactant comprising a compound selected from the group consisting of an alcohol and a diol, said co-surfactant having a carbon chain length ranging from three to eight carbon atoms.

* * * * *